US009342569B2

United States Patent
Kauerauf (10) Patent No.: US 9,342,569 B2
(45) Date of Patent: May 17, 2016

(54) SYSTEM AND METHOD OF ADDING USER INTERFACE ELEMENT GROUPS

(75) Inventor: Bernd Kauerauf, Heidelberg (DE)

(73) Assignee: SAP SE, Walldorf (DE)

( * ) Notice: Subject to any disclaimer, the term of this patent is extended or adjusted under 35 U.S.C. 154(b) by 1238 days.

(21) Appl. No.: 12/968,596

(22) Filed: Dec. 15, 2010

(65) Prior Publication Data

US 2012/0159392 A1    Jun. 21, 2012

(51) Int. Cl.
- G06F 17/30 (2006.01)
- G06F 3/0481 (2013.01)
- G06F 3/0482 (2013.01)
- G06F 9/44 (2006.01)

(52) U.S. Cl.
CPC .......... *G06F 17/3056* (2013.01); *G06F 3/0481* (2013.01); *G06F 17/30342* (2013.01); *G06F 17/30412* (2013.01); *G06F 17/30554* (2013.01); *G06F 17/30601* (2013.01); *G06F 3/0482* (2013.01); *G06F 9/4443* (2013.01); *G06F 2203/04803* (2013.01); *Y10S 707/99943* (2013.01)

(58) Field of Classification Search
CPC . G06F 3/0486; G06F 3/04886; G06F 3/0481; G06F 3/04817; G06F 3/0482; G06F 2203/04803; G06F 17/30601; G06F 17/30342; G06F 17/30412; G06F 17/30554; G06F 17/3056; Y10S 707/99943
USPC .......................................................... 715/826
See application file for complete search history.

(56) References Cited

U.S. PATENT DOCUMENTS

| | | | | |
|---|---|---|---|---|
| 5,627,960 | A * | 5/1997 | Clifford | G06F 3/0482 345/902 |
| 5,805,167 | A * | 9/1998 | van Cruyningen | G06F 3/0482 715/808 |
| 6,075,530 | A * | 6/2000 | Lucas et al. | 715/804 |
| 6,301,579 | B1 * | 10/2001 | Becker | |
| 6,304,260 | B1 * | 10/2001 | Wills | 715/853 |
| 6,460,031 | B1 * | 10/2002 | Wilson et al. | 707/769 |
| 7,262,772 | B2 * | 8/2007 | Ebert | 345/440 |
| 7,456,832 | B1 * | 11/2008 | Fabbio | G06F 3/0482 345/440 |
| 7,904,828 | B2 * | 3/2011 | Conrad et al. | 715/799 |
| 8,156,015 | B1 * | 4/2012 | Gaw | 705/27.2 |
| 8,582,925 | B2 * | 11/2013 | Mirtich et al. | 382/309 |
| 8,683,364 | B2 * | 3/2014 | Menzl et al. | 715/771 |
| 2001/0042063 | A1 * | 11/2001 | Ebert | 707/3 |
| 2003/0120753 | A1 * | 6/2003 | Ebert | 709/219 |
| 2003/0179237 | A1 * | 9/2003 | Nelson et al. | 345/765 |
| 2004/0267122 | A1 * | 12/2004 | Nadadur et al. | 600/440 |
| 2006/0167704 | A1 * | 7/2006 | Nicholls et al. | 705/1 |
| 2006/0242557 | A1 * | 10/2006 | Nortis, III | G06F 3/0482 715/234 |

(Continued)

*Primary Examiner* — Eric Wiener
(74) *Attorney, Agent, or Firm* — Fountainhead Law Group PC (57) ABSTRACT

In one embodiment the present invention includes a computer implemented method of adding user interface elements within an application program. The method includes generating a user interface layout having user interface elements and database connections, where the database connections relate the user interface elements to a database. The method further includes generating a selection layout having element groups, where each of the element groups includes a first element and a second element that are spatially related. The method further includes receiving a user selection of a selected element group of the element groups, and generating the user interface layout having the user interface elements, where the user interface elements now includes the selected element group. In this manner, the user interface layout may be efficiently adjusted.

20 Claims, 5 Drawing Sheets

(56) References Cited

U.S. PATENT DOCUMENTS

| | | | |
|---|---|---|---|
| 2006/0288300 A1* | 12/2006 | Chambers et al. | 715/744 |
| 2007/0288860 A1* | 12/2007 | Ording et al. | 715/779 |
| 2008/0244422 A1* | 10/2008 | Hilgers et al. | 715/763 |
| 2008/0244423 A1* | 10/2008 | Jensen-Pistorius et al. | 715/763 |
| 2009/0028393 A1* | 1/2009 | Kim et al. | 382/118 |
| 2009/0125828 A1* | 5/2009 | Fried et al. | 715/769 |
| 2010/0131851 A1* | 5/2010 | Reese et al. | 715/732 |
| 2010/0306259 A1* | 12/2010 | Svinth | G06F 17/30625 707/776 |
| 2010/0313157 A1* | 12/2010 | Carlsson et al. | 715/769 |
| 2011/0029536 A1* | 2/2011 | Knight et al. | 707/740 |
| 2011/0185300 A1* | 7/2011 | Hinckley et al. | 715/769 |
| 2011/0225158 A1* | 9/2011 | Snyder et al. | 707/737 |
| 2012/0023402 A1* | 1/2012 | Cifra | G06F 3/0481 715/704 |
| 2012/0084689 A1* | 4/2012 | Ledet et al. | 715/769 |
| 2013/0111380 A1* | 5/2013 | Parker et al. | 715/765 |
| 2014/0109044 A1* | 4/2014 | Cifra | 717/113 |

* cited by examiner

SYSTEM AND METHOD OF ADDING USER INTERFACE ELEMENT GROUPS

CROSS REFERENCE TO RELATED APPLICATIONS

Not applicable.

BACKGROUND

The present invention relates to user interfaces, and in particular, to editing a user interface using element groups.

Unless otherwise indicated herein, the approaches described in this section are not prior art to the claims in this application and are not admitted to be prior art by inclusion in this section.

When customizing a user interface, often it is desired to add user interface elements. However, when related elements are created, there exists the possibility that one element will be misplaced with respect to the other element. This decreases the efficiency of the user as they must expend effort to locate and replace the misplaced element.

SUMMARY

Embodiments of the present invention improve the efficiency of customizing user interfaces. In general, two or more user interface elements are grouped together into a group element, with the individual elements having a defined spatial relationship that is maintained when the group is used to customize the user interface. In addition, the individual elements in a group may have a semantic relationship.

In one embodiment the present invention includes a computer implemented method of adding user interface elements within an application program. The method includes generating a user interface layout having user interface elements and database connections, where the database connections relate the user interface elements to a database. The method further includes generating a selection layout having element groups, where each of the element groups includes a first element and a second element that are spatially related. The method further includes receiving a user selection of a selected element group of the element groups, and generating the user interface layout having the user interface elements, where the user interface elements now includes the selected element group.

A computer program, embodied on a tangible recording medium, may control a computer system to perform the above method. The computer program may include a user interface layout component, a selection layout component, and an interface component.

A computer system may include a database server and an application server that perform the above method. The database server is configured to store a database. The application server is configured to generate a user interface layout as described above regarding the method.

The following detailed description and accompanying drawings provide a better understanding of the nature and advantages of the present invention.

DETAILED DESCRIPTION

Described herein are techniques for using user interface element groups. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

Figure 1:
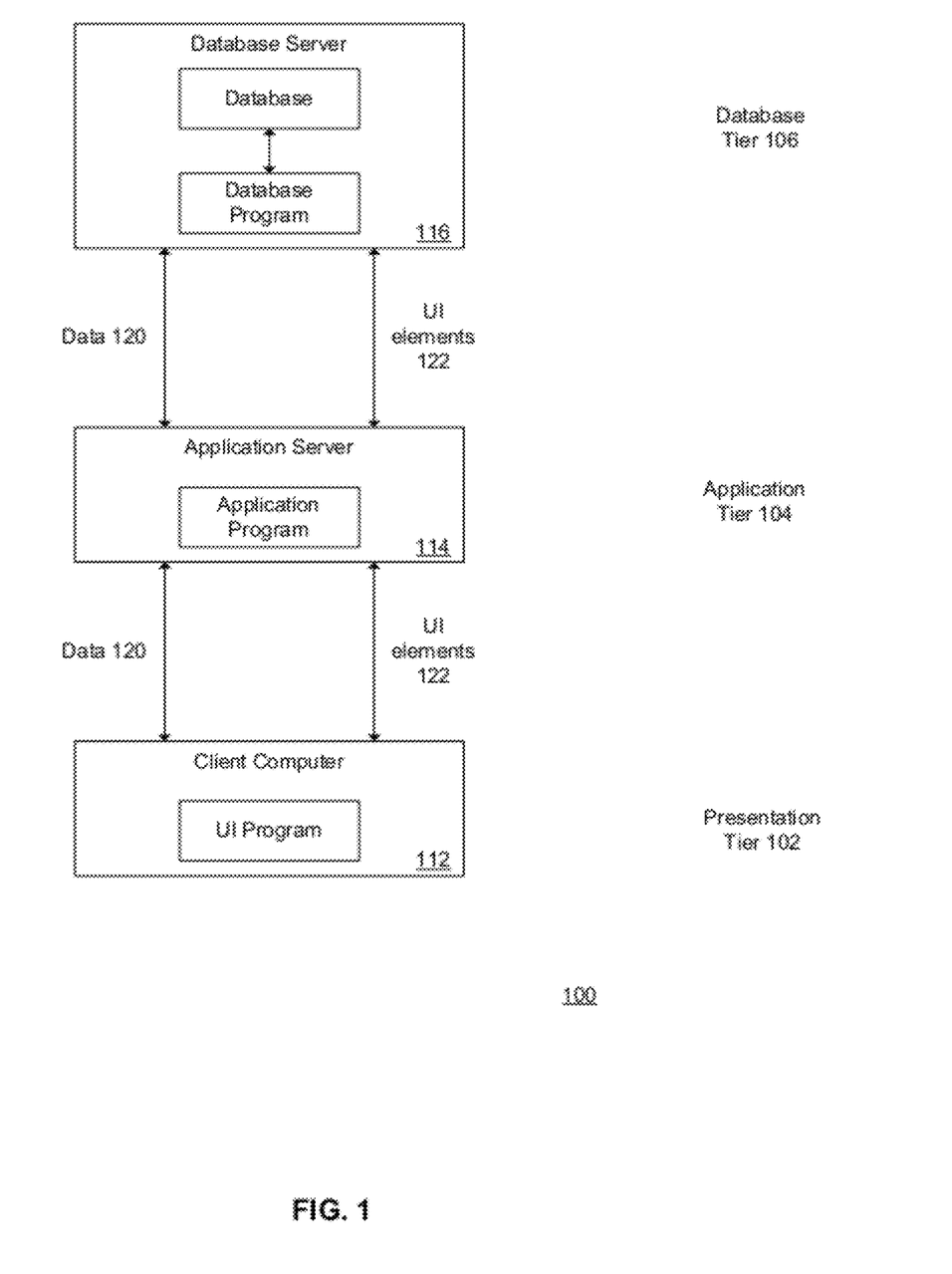
FIG. 1 is a block diagram of a three tier architecture system that may be used to implement an embodiment of the present invention.

FIG. 1 is a block diagram of a three tier architecture system 100 that may be used to implement an embodiment of the present invention. The system 100 includes a presentation tier 102, an application tier 104, and a database tier 106. Each tier may include one or more devices (only one device is shown for illustration purposes). A network (not shown) connects the devices within and between the tiers. The network may include one or more networks, such as a local area network, a wide area network, or the internet.

The presentation tier 102 generally includes one or more client computers 112. The client computer 112 generally provides a graphical user interface for users to interact with the other parts of the system 100. More specifically, the client computer 112 executes a user interface program. The user interface may be implemented by a browser, for example as a Java application.

The application tier 104 generally includes one or more application servers 114. The application server 114 generally implements the business logic for processing interactions between the users and the underlying data. This business logic is generally referred to as "the application" or "the application program" that is executed by the application server 114. The application tier 104 may implement various applications to perform various functions, such as invoicing, inventory control, supply chain management, etc. Various of the application servers 114 may perform different functions. For example, one of the application servers 114 may be used for prototyping or development, while the others may be used for business intelligence production activities.

The database tier 106 generally includes one or more database servers 116. The database server 116 generally implements a database management system that stores and manipulates the underlying data and related metadata. This database management system is generally referred to as "the database" or "the database system" or "the database program" that is executed by the database server 116. More specifically, the database server 116 includes or connects to persistent storage (e.g., a hard drive) that stores "the database". The database server 116 may implement various types of database systems, including DB2, Informix, MaxDB, Oracle and Microsoft SQL Server.

Although one device is shown in each tier, such is mainly for illustration purposes; additional devices may be included in various implementations, for example to provide scalability. For example, a single database server 116 may be used in the basic configuration, but as the amount of data in the databases increases, the number of database servers 116 may be increased. As another example, a single application server 114 may be used in the basic configuration, but as the amount of business logic processes increases, the number of application servers 114 may be increased.

The system 100 may be implemented in a variety of operating systems, for example, UNIX (AIX, HP-UX, Solaris, Linux), Microsoft Windows, IBM Series i (former iSeries, AS/400) and IBM zSeries (former S/390). The various devices in the various tiers may implement different operating systems. For example, a client computer 112 may run Microsoft Windows and an application server 114 may implement Linux. Note that various devices generally implement both an operating system program and another program, which are distinct. For example, a client computer 112 may implement Microsoft Windows (operating system) and Microsoft Internet Explorer (user interface program). An application server 114 may implement Linux (operating system) and an invoicing system (application program). A database server 116 may implement Linux (operating system) and Oracle database (database program).

The SAP Web Application Server is a specific example of an implementation of the system 100. An embodiment of the present invention generally involves an application program, a user interface (UI) program and a database program. More specifically, the database program stores data 120 and UI elements 122 in the database; the application program uses the data 120 and the UI elements 122 as part of implementing a data processing system; and the UI program outputs the data 120 and the UI elements 122 to the user, and receives user input that may edit the data 120 or the UI elements 122. Further details are provided below.

Figure 2:
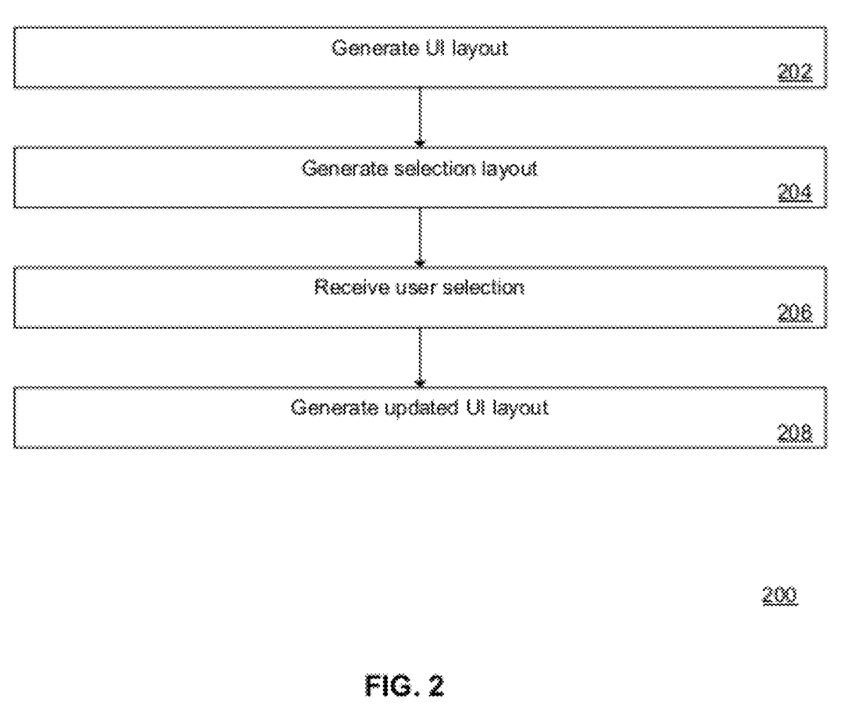
FIG. 2 is a flowchart of a method of adding user interface elements within an application program, according to an embodiment.
Figure 3:
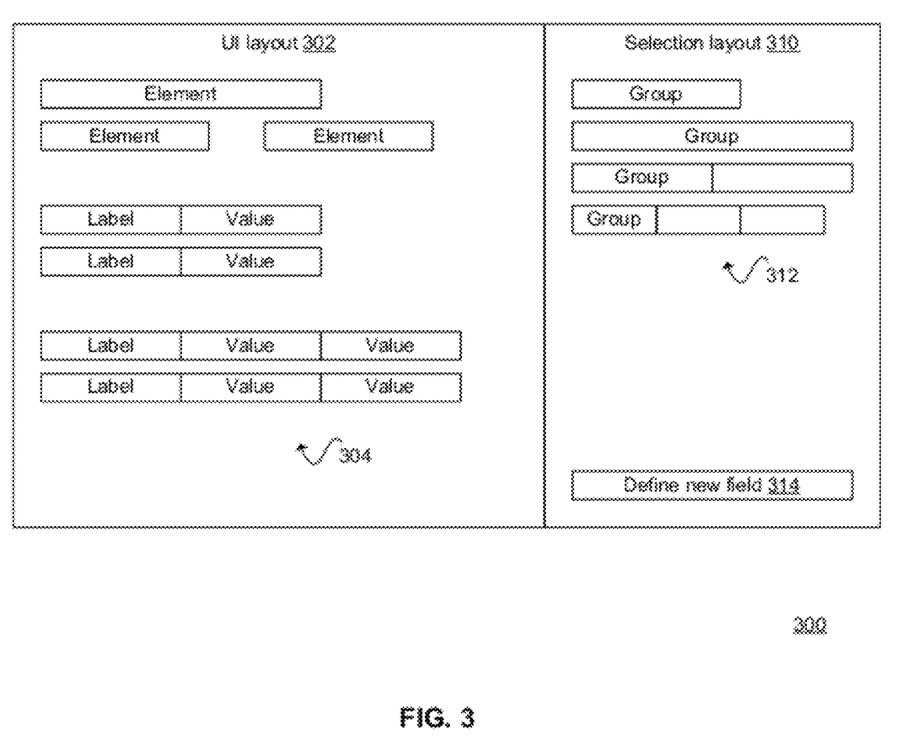
FIG. 3 is a diagram showing an example screen shot that shows various of the features discussed in FIG. 2.

FIG. 2 is a flowchart of a method 200 of adding user interface elements within an application program, according to an embodiment. FIG. 3 is a diagram showing an example screen shot 300 that shows various of the features discussed in FIG. 2. The method 200 may be performed by the system 100 (see FIG. 1), more specifically by the application server 114, for example as a result of executing the application program.

At 202, the application server generates a user interface layout. The UI layout may have user interface elements and database connections. The database connections relate the user interface elements to a database. In FIG. 3, note the UI layout 302 that includes the UI elements 304. In general, the UI elements 304 display data that is stored in the database, often with a related label. For example, a particular UI element may have a label "customer number" and an input field that displays the customer number stored in the database (or allows user input of the customer number to be stored in the database). The UI layout may initially have no elements (with the elements being added as further detailed below).

At 204, the application server generates a selection layout having additional elements. These additional elements may also be referred to as "groups", as further detailed below. Each of the additional elements includes a first element and a second element that are spatially related. In FIG. 3, note the selection layout 310 that includes the additional elements 312. In general, the additional elements 312 correspond to preconfigured UI elements that may be added to the UI layout 302. The additional elements 312 may correspond to column elements in the database. For example, the database may include fields that are not by default included for display in the UI layout 302. The additional elements 312 then correspond to these fields. Additional details regarding the additional elements 312 are provided with reference to FIG. 4 below.

At 206, the application server receives a user selection of a selected additional element of the plurality of additional elements. As shown in FIG. 3, the UI program displays the UI layout 302 and the selection layout 310 on the client computer 112. In general, the UI program on the client computer 112 includes drag and drop functionality for the user to select one of the additional elements and to drag it to a desired location on the UI layout 302.

In addition, the selection layout 310 includes a "define new field" button 314. The new field button 314 allows the user to create a new additional element in the selection layout 310; the system 100 then allows the user to relate the new field to an existing column in the database, or adds that new field as a column element in the database. The user may also add logic to relate the element to the database, or to relate multiple elements together (see the multiple value elements discussed below for FIG. 4). The user may then drag and drop the new field in the same manner as the other additional elements 312. Options for a new field include the general types of groups shown in FIG. 4. The user may also add new labels that need not correspond to elements in the database.

At 208, the application server generates the user interface layout that now includes the selected additional element (see 206). In general, this results from the user dropping the selected additional element to the UI layout 302 (see 206). After the user has finished adding UI elements, the user can instruct the application server not to display the selection layout 310.

In general, the UI layout 302 and the selection layout 310 may both contain element groups, so with respect to an element group there is no conceptual difference between the UI layout 302 and the selection layout 310. An element group may be moved from the UI layout 302 to the selection layout 310 and vice versa, an element group may be removed from the UI layout 302 or from the selection layout 310, the order of element groups in the UI layout 302 and the selection layout 310 may be changed, etc.

According to an embodiment, the user normally works with the UI layout 302, and can request the display of the selection layout 310 in what may be referred to as an "enhancement mode". The user may activate (or deactivate) the enhancement mode by toggling a button, for example in the UI layout 302.

As mentioned above, the system 100 (see FIG. 1) may perform the method 200. For example, the application program executed by the application server 114 may include a user interface layout component that generates the user interface layout (see 202 and 208), a selection layout component that generates the selection layout (see 204), and an interface component that receives the user selection (see 206). The UI program executed by the client computer 112 may display the user interface layout and perform the other user interface functions such as receiving the user selections, implementing drag and drop, etc.

Figure 4:
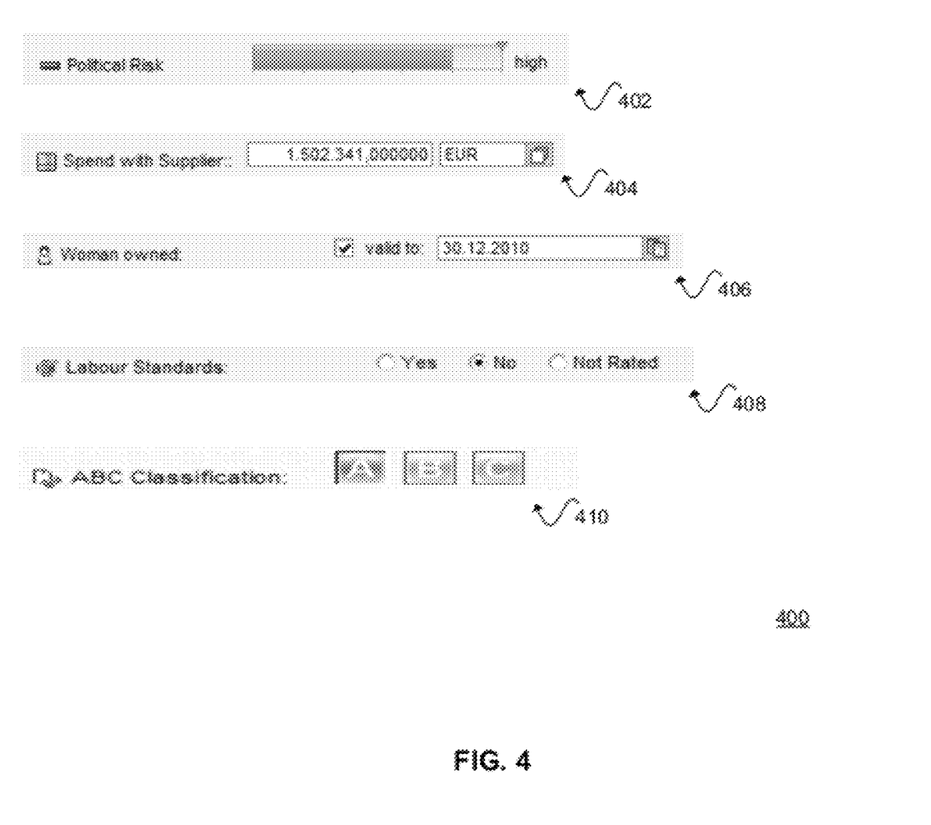
FIG. 4 is a diagram showing an example screen shot that shows various options for the additional elements.

FIG. 4 is a diagram showing an example screen shot 400 that shows various options for the additional elements 312. In general, each additional element includes two or more elements that function together, and may be referred to as a "group element", an "element group" or simply as a "group". These groups include a threshold slider group 402, a currency group 404, a validity group 406, a radio button group 408, and a toggle button group 410. In general, each of these element groups includes a label element (also referred to as simply a "label") and a value element (also referred to as simply a "value"). The label element corresponds to a column in the database, and the value element corresponds to the data in that column for a particular record (or particular row). In addition, the elements may be further differentiated by type, for example, a check box element, a slider element, a date element, etc. For example, for the threshold slider group 402, the label is "political risk"; the value may be selected on the slider (e.g., 0, 1, 2, 3, 4 or 5); and a textual label may be displayed that corresponds to the value (e.g., blank, very low, low, medium, high or very high).

An element group may also have two or more value elements. One value element may be related to or depend upon another value element. For example, for the currency group 404, the label is "spend with supplier", the first value is the amount (1.502.341,000000), and the second value is the currency of the amount (EUR). For the validity group 406, the label is "woman owned", the first value is a check box, and the second value is the date to which the status "woman owned" remains valid. Input or display of data in the second value area may be disabled unless the check box for the first value is checked. For the radio button group 408, the label is "labour standards" and for the value one of three options may be selected (yes, no or not rated). For the toggle button group 410, the label is "ABC classification", the first value is whether or not "A" is toggled, the second value is whether or not "B" is toggled, and the third value is whether or not "C" is toggled. (Note that for the toggle button group, the values need not relate to or depend upon each other; they may be toggled independently.)

In general, an element group may contain any number of elements. Most typical examples include a label and between one and four value elements. All elements then have spatial relationships with each other, and may also have semantic relations expressed in business logic.

Although the element groups described above have labels, other types of element groups need not have labels. Examples include a caption group (e.g., two or more value elements into which the user can enter customizable caption data), a table group (e.g., two or more value elements formatted in a table or grid structure), and a calendar group (e.g., seven value elements formatted into a weekly grid structure, or thirty value elements formatted into a monthly grid structure, into which data may be entered).

In addition, an element group may contain another element group; the combined groups may be referred to as a "recursive group". A recursive group may contain two or more element groups. For example, a recursive group may contain a toggle button group with three buttons; each of the buttons is then associated with a currency group. In this example, the toggle button group may be referred to as the primary group (of the recursive group), and the three currency groups may be referred to as the secondary groups. Note that labels may become redundant in certain recursive groups, for example when the label of the primary group is sufficiently descriptive such that the labels for the secondary groups may be omitted.

The elements in the groups shown in FIG. 4 have a spatial relationship that enhances the efficiency of the user when adding elements to the UI layout 302. In general, the term "spatial" relationship refers to the x and y coordinate locations of elements on the computer screen, and not absolute in relation to the overall computer screen display area. So when two elements have a spatial relationship, one element is located a short distance from the other in the x direction, or in the y direction, or both. ("Short distance" is a relative term that depends upon the particular UI implemented; in general, from a UI design perspective, it is desirable to place related elements within a short distance of each other.) These spatial relationships include those between (1) the label and a single value (e.g., in groups 402 and 410), and/or (2) the label and multiple values (e.g., in groups 404, 406 and 408). By selecting one of the group elements (see FIG. 4) available in the selection layout 310, the user is able to easily drag and drop the selected group element (e.g., the two or more elements that in combination form the group element) to the UI layout 302. This may be contrasted with existing systems in which a user is required to first drag and drop one element (e.g., the label), then drag and drop another element (e.g., the value); the possibility exists for the user to misplace one of the elements, creating inefficiency as the user is forced to correct the misplacement.

The improvement is even more pronounced when the user is adding an element group with two values, for example the validity group 406. In an existing system, the user must create the label (woman owned) and the first value element (check box), then create the second value element (date), then create program logic to relate the first value element to the second value element (e.g., the second value element is inoperative until the first value element gets checkmarked), then drag the label to its appropriate location, then drag the first value element to its appropriate location, and finally drag the second value element to its appropriate location. In contrast, with the system 100, the validity group 406 may be dragged from the selection layout 310, very efficiently and without concern that one of the component elements is misplaced. More generally, the spatial relationship between the elements in a group may be defined for all the groups in the selection layout 310; this spatial relationship is then preserved when the selected group is dropped into the UI layout 302.

Additional Details

As mentioned above with reference to FIG. 1, the database stores the data 120 and the UI elements 122. The UI elements 122 thus include data that corresponds to the UI layout 302, the selection layout 310, the UI elements 304, and the additional elements 312. The application server 114 then receives the UI elements 122 from the database in order to generate the user interface layout 302 and the selection layout 310. As the user selects a group element from the additional elements 312 to drop into the selection layout 310, the application server 114 directs the database server 116 to update the UI elements 122 in the database accordingly.

As mentioned above with reference to FIG. 1, the client computer 112 displays the information received from the application server 114. More specifically, the application server 114 generates the user interface layout 302 and the selection layout 310, and transmits them to the client computer 112 for display.

The group elements in FIG. 4 may be correspond to the fields in the database that are not shown by default in the user interface layout 302. For example, if the database has 10 elements, 5 are shown by default in the user interface layout 302, and the 5 not shown instead appear in the selection layout 310. This allows the user to easily customize the user interface layout 302.

Similarly, the group elements in FIG. 4 may correspond to template elements. For example, instead of the group elements corresponding to existing fields in the database, the group elements are just the generic types (threshold slider group, currency group, validity group, radio button group, toggle button group, etc.); upon selection of a group, the user then makes a database connection to connect the selected group to a desired field in the database. The application server 114 then updates the label (and the value, if a value already exists for the current record) according to the database connection.

As mentioned above, the individual elements in a group may have a semantic relationship. For example, when the elements are a currency and an amount, the selection of a particular currency (e.g., U.S. dollars) may be used to indicate that the amount has a defined number of decimal digits (e.g., two decimal digits to represent cents). As another example, when the elements are a check box and a date, the semantic relationship may be that when the check box is selected (e.g., "woman owned"), the selection is valid though that date.

The selection layout 310 may include a static area and a dynamic area. The elements in the static area are "locked"; for example, they cannot be moved or deleted, their labels cannot be edited, etc. The elements in the dynamic area may be moved, edited, deleted, etc. In addition, the additional elements from the selection layout 310 may be dropped in the dynamic area, but not in the static area.

Figure 5:
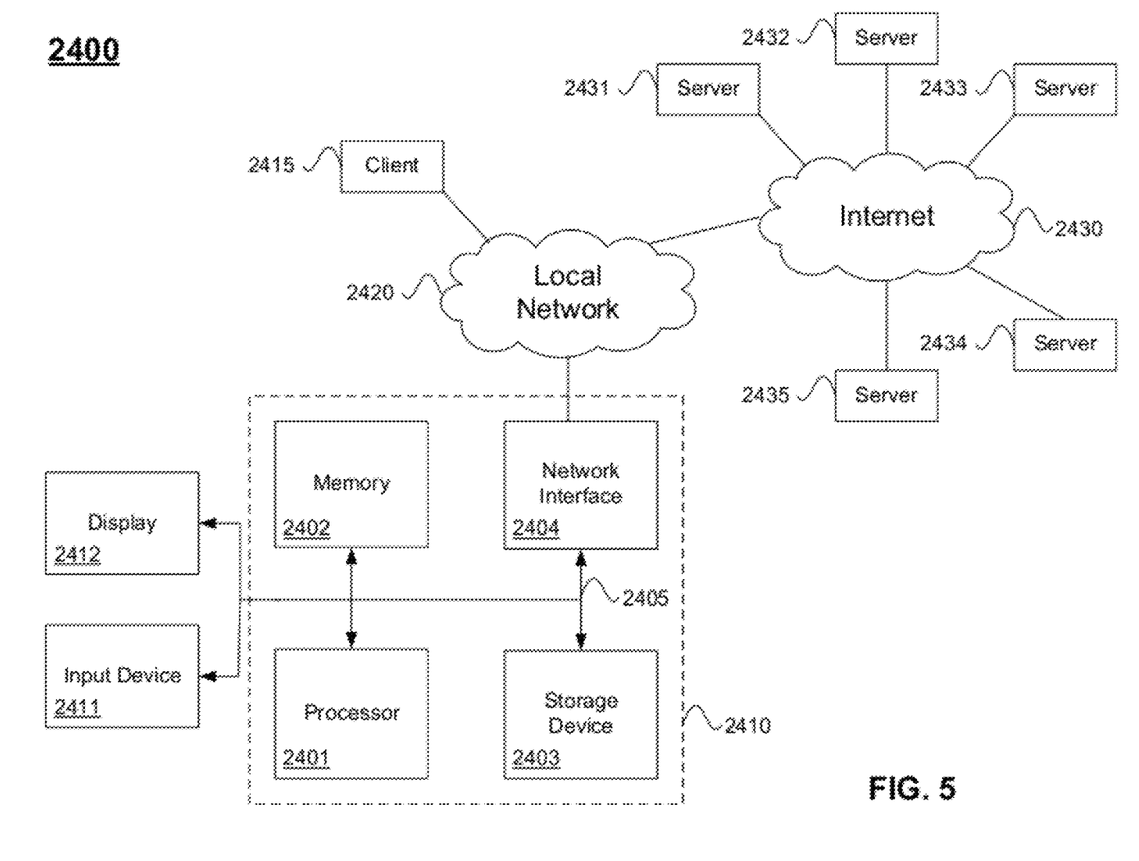
FIG. 5 is a block diagram of an example computer system and network for implementing embodiments of the present invention.

FIG. 5 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2410 may implement the system 100 described above, for example by executing one or more computer programs. For example, the computer system 2410 may implement the application server 114; the server 2431 may implement the database server 116; and the client 2415 may implement the client computer 112.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of adding user interface elements within an application program, comprising:
   generating, by an application server, a user interface layout having a plurality of user interface elements and a plurality of database connections, wherein the plurality of database connections relate the plurality of user interface elements to a database;
   generating, by the application server, a selection layout having a plurality of element groups, wherein each of the plurality of element groups includes a recursive group, wherein the recursive group includes a primary group and a secondary group, wherein the primary group includes a first plurality of elements that includes a first element and the secondary group, wherein the secondary group includes a second plurality of elements that includes a second element, wherein the first element and the secondary group are related in the user interface layout;
   receiving, by the application server, a user selection of an element group of the plurality of element groups as a selected element group; and generating, by the application server, the user interface layout having the plurality of user interface elements, wherein the plurality of user interface elements now includes the selected element group, wherein the selected element group includes a first selected element and a second selected element, wherein the first selected element and the second selected element have a semantic relationship such that when a particular selection of the first selected element is selected, a feature of the second selected element is defined, wherein the database includes a first plurality of fields and a second plurality of fields, wherein the first plurality of fields are included in the user interface layout, and wherein the second plurality of fields are included in the selection layout, wherein the user interface layout includes a first area and a second area, wherein the selected element group may only be generated in the second area, and wherein the selection layout includes a static area and a dynamic area, wherein the static area includes a static element that is locked, and wherein the dynamic area includes a dynamic element that is editable, further comprising:

receiving a user input; and selectively displaying the user interface layout according to the user input.

2. The method of claim 1, further comprising:

storing, by a database server, the database that includes user interface layout data that corresponds to the user interface layout, selection layout data that corresponds to the selection layout, user interface element data that corresponds to the plurality of user interface elements, element group data that corresponds to the plurality of element groups, and selected element group data that corresponds to the selected element group.

3. The method of claim 1, further comprising:

storing, by a database server, the database that includes user interface layout data that corresponds to the user interface layout, selection layout data that corresponds to the selection layout, user interface element data that corresponds to the plurality of user interface elements, and element group data that corresponds to the plurality of element groups; and receiving, by the application server from the database server, the user interface layout data, the selection layout data, the user interface element data, and the element group data.

4. The method of claim 1, further comprising:

receiving, by the application server from a database server, user interface layout data that corresponds to the user interface layout, selection layout data that corresponds to the selection layout, user interface element data that corresponds to the plurality of user interface elements, and element group data that corresponds to the plurality of element groups; and storing, by the database server in the database, selected element group data that corresponds to the selected element group.

5. The method of claim 1, further comprising:

transmitting, from the application server to a client computer, the user interface layout and the selection layout; and receiving, from the client computer, the user selection of the selected element group.

6. The method of claim 1, further comprising:

receiving, by the application server, an additional database connection that relates the selected element group to the database.

7. The method of claim 1, further comprising:

receiving, by the application server, an additional database connection that relates the selected element group to the database, wherein the user configures the additional database connection when selecting the selected element group.

8. The method of claim 1, wherein the first element and the second element correspond to a template that includes an additional database connection.

9. The method of claim 1, wherein each of the plurality of element groups further includes:

a third element that is related in the user interface layout to the first element and the second element.

10. The method of claim 1, wherein an element group in the plurality of element groups corresponds to a threshold slider group that includes a label element and a value element, wherein the label element corresponds to the first element, and wherein the value element corresponds to the second element.

11. The method of claim 1, wherein an element group in the plurality of element groups corresponds to a currency group that includes a label element, a first value element and a second value element, wherein the first value element corresponds to an amount, and wherein the second value element corresponds to a currency.

12. The method of claim 1, wherein the primary group comprises three elements, wherein the secondary group comprises two elements, and wherein the secondary group is one of the three elements.

13. The method of claim 1, wherein the secondary group is one of a plurality of secondary groups.

14. The method of claim 1, wherein the primary group comprises three elements, wherein the secondary group is one of three secondary groups, and wherein each of the three elements of the primary group is associated with a corresponding one of the three secondary groups.

15. The method of claim 1, wherein the secondary group is one of a plurality of secondary groups, wherein each of the plurality of secondary groups has two elements.

16. The method of claim 1, wherein the primary group comprises three elements, wherein the secondary group is one of three secondary groups, wherein each of the three secondary groups has two elements, and wherein each of the three elements of the primary group is associated with a corresponding one of the three secondary groups.

17. The method of claim 1, wherein the semantic relationship is expressed in business logic.

18. The method of claim 1, wherein the semantic relationship is expressed in business logic implemented by the application server, wherein the application server uses the business logic to define the feature of the second selected element when the particular selection of the first selected element is selected.

19. A non-transitory tangible recording medium for recording a computer program, for controlling a computer system to add user interface elements within an application program, the computer program comprising:

a user interface layout component that controls an application server to generate a user interface layout having a plurality of user interface elements and a plurality of database connections, wherein the plurality of database connections relate the plurality of user interface elements to a database;

a selection layout component that controls the application server to generate a selection layout having a plurality of element groups, wherein each of the plurality of element groups includes a recursive group, wherein the recursive group includes a primary group and a secondary group, wherein the primary group includes a first plurality of elements that includes a first element and the secondary group, wherein the secondary group includes a second plurality of elements that includes a second element, wherein the first element and the secondary group are related in the user interface layout; and an interface component that controls the application server to receive from a client computer a user selection of an element group of the plurality of element groups as a selected element group, wherein the user interface layout component controls the application server to generate the user interface layout having the plurality of user interface elements, wherein the plurality of user interface elements now includes the selected element group, wherein the selected element group includes a first selected element and a second selected element, wherein the first selected element and the second selected element have a semantic relationship such that when a particular selection of the first selected element is selected, a feature of the second selected element is defined, wherein the database includes a first plurality of fields and a second plurality of fields, wherein the first plurality of fields are included in the user interface layout, and wherein the second plurality of fields are included in the selection layout, wherein the user interface layout includes a first area and a second area, wherein the selected element group may only be generated in the second area, and wherein the selection layout includes a static area and a dynamic area, wherein the static area includes a static element that is locked, and wherein the dynamic area includes a dynamic element that is editable, wherein the interface component controls the application server to receive from the client computer a user input, and wherein the user interface layout component controls the application server to selectively display the user interface layout according to the user input.

20. A system for controlling a computer system to add user interface elements within an application program, comprising:

a database server that is configured to store a database; and an application server that is configured to generate a user interface layout having a plurality of user interface elements and a plurality of database connections, wherein the plurality of database connections relate the plurality of user interface elements to the database;

wherein the application server is configured to generate a selection layout having a plurality of element groups, wherein each of the plurality of element groups includes a recursive group, wherein the recursive group includes a primary group and a secondary group, wherein the primary group includes a first plurality of elements that includes a first element and the secondary group, wherein the secondary group includes a second plurality of elements that includes a second element, wherein the first element and the secondary group are related in the user interface layout, wherein the application server is configured to receive from a client computer a user selection of an element group of the plurality of element groups as a selected element group, and wherein the application server is configured to generate the user interface layout having the plurality of user interface elements, wherein the plurality of user interface elements now includes the selected element group, wherein the selected element group includes a first selected element and a second selected element, wherein the first selected element and the second selected element have a semantic relationship such that when a particular selection of the first selected element is selected, a feature of the second selected element is defined, wherein the database includes a first plurality of fields and a second plurality of fields, wherein the first plurality of fields are included in the user interface layout, and wherein the second plurality of fields are included in the selection layout, wherein the user interface layout includes a first area and a second area, wherein the selected element group may only be generated in the second area, and wherein the selection layout includes a static area and a dynamic area, wherein the static area includes a static element that is locked, and wherein the dynamic area includes a dynamic element that is editable, wherein the application server receives from the client computer a user input, and wherein the application server selectively displays the user interface layout according to the user input.

* * * * *